United States Patent
Xu et al.

(10) Patent No.: US 10,914,700 B2
(45) Date of Patent: Feb. 9, 2021

(54) SINGLE CANTILEVER GAS SENSOR, SENSOR ARRAY, AND MANUFACTURING METHOD THEREOF

(71) Applicant: HEFEI MICRO NANO SENSING TECHNOLOGY CO., LTD., Hefei (CN)

(72) Inventors: Lei Xu, Hefei (CN); Dongcheng Xie, Hefei (CN); Shufeng Peng, Hefei (CN)

(73) Assignee: HEFEI MICRO NANO SENSING TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 16/482,275

(22) PCT Filed: Dec. 12, 2018

(86) PCT No.: PCT/CN2018/120549
§ 371 (c)(1),
(2) Date: Jul. 31, 2019

(87) PCT Pub. No.: WO2019/214229
PCT Pub. Date: Nov. 14, 2019

(65) Prior Publication Data
US 2020/0333277 A1    Oct. 22, 2020

(30) Foreign Application Priority Data
May 11, 2018  (CN) .......................... 2018 1 0447798

(51) Int. Cl.
*G01N 27/12*  (2006.01)
*G01N 27/16*  (2006.01)
*G01N 27/14*  (2006.01)

(52) U.S. Cl.
CPC ........... *G01N 27/128* (2013.01); *G01N 27/16* (2013.01)

(58) Field of Classification Search
CPC .... G01N 37/128; G01N 27/16; G01N 27/123; B81B 3/0037; B81C 2201/0105;
(Continued)

(56) References Cited

U.S. PATENT DOCUMENTS

| 2008/0079333 A1* | 4/2008 | Ulm ...................... H02N 2/186 310/339 |
| 2015/0353352 A1* | 12/2015 | Lee ...................... H01L 41/094 29/25.35 |
| 2017/0148592 A1* | 5/2017 | Tabib-Azir .......... H01L 41/1132 |

FOREIGN PATENT DOCUMENTS

| CN | 104181203 A | 12/2014 |
| CN | 105116023 A | 12/2015 |

(Continued)

*Primary Examiner* — Daniel S Larkin
*Assistant Examiner* — Anthony W Megna Fuentes
(74) *Attorney, Agent, or Firm* — Bayramoglu Law Offices LLC

(57) ABSTRACT

A single cantilever gas sensor includes a silicon substrate, a supporting film, a heating resistor, a isolation film, and a detecting electrode, which are successively stacked. The gas sensor is T-shaped and has a base structure and a cantilever structure The end portion of the cantilever structure is provided with a gas sensitive material. The present invention further provides a sensor array composed of the single cantilever gas sensors and a method for manufacturing the gas sensor. The method includes (1) selecting a silicon substrate; (2) preparing a supporting film; (3) preparing a heating resistor; (4) preparing an isolation film; (5) preparing a detecting electrode; (6) releasing a membrane; (7) loading a gas sensitive material.

20 Claims, 3 Drawing Sheets

(58) Field of Classification Search
CPC .... B81C 2201/0133; B81C 2201/0176; B81C 1/0015
See application file for complete search history.

(56) References Cited

FOREIGN PATENT DOCUMENTS

| | | |
|---|---|---|
| CN | 205449859 U | 8/2016 |
| CN | 205449863 U | 8/2016 |
| CN | 106093138 A | 11/2016 |
| CN | 106495086 A | 3/2017 |
| CN | 107089640 A | 8/2017 |
| CN | 108318548 A | 7/2018 |
| WO | 2018043792 A1 | 3/2018 |

\* cited by examiner

SINGLE CANTILEVER GAS SENSOR, SENSOR ARRAY, AND MANUFACTURING METHOD THEREOF

CROSS REFERENCE TO THE RELATED APPLICATIONS

This application is the national phase entry of International Application No. PCT/CN2018/120549, filed on Dec. 12, 2018, which is based upon and claims priority to Chinese Patent Application No. 201810447798.2, filed on May 11, 2018, the entire contents of which are incorporated herein by reference.

TECHNICAL FIELD

The present invention belongs to the technical field of microelectronic mechanical systems and gas detection, and particularly relates to a single cantilever gas sensor and a sensor array, and a manufacturing method thereof.

BACKGROUND

Gas sensors based on the technique of microelectronic mechanical system (MEMS) have gradually shown a great application potential owing to their small size, low power consumption, high sensitivity, fast response, etc., and are expected to replace the gas sensors based on traditional techniques, and are widely used in the fields of Internet of Things (IoTs), mobile terminals, and artificial intelligence (AI), etc. Moreover, among those MEMS gas sensors, sensors which use the metal oxide semiconductor (MOS) material have wide detection ranges and would have broader market space in the large-scale applications in the future.

The existing MEMS MOS gas sensors are mainly based on the research of suspended-film-type micro heaters. The sensors of this structure have a relatively low power consumption, generally as low as 20 milliwatts. For example, the Chinese utility model patent No. CN201520759054.6 (application number) discloses a resistive gas sensor having a four-supporting-cantilever four-layer structure which includes a silicon substrate frame, a heating film layer, a heating electrode layer, and a sensitive film layer. The silicon substrate frame, heating film layer, heating electrode layer, and sensitive film layer are arranged from bottom to top in order. Further, the heating film layer includes a heating film zone which is connected to the silicon substrate frame by four cantilevers. In another example, Chinese utility model patent NO. CN201520759055.0 discloses a resistive gas sensor having a two-supporting-cantilever four-layer structure which also includes a silicon substrate frame, a heating film layer, a heating electrode layer, and a sensitive film layer. The silicon substrate frame, heating film layer, heating electrode layer, and sensitive film layer are arranged from bottom to top in order. Further, the heating film layer includes a heating film zone which is connected to the silicon substrate frame by two cantilevers. Although having lower power consumption, these multi-cantilever type gas sensors can no longer meet the needs with the rapid development of the applications of mobile terminal and Internet of Things. Moreover, in the manufacturing of these multi-cantilever type gas sensors, there are problems of complicated process, difficult positioning, and low efficiency.

SUMMARY

The technical problem to be solved by the present invention is how to further reduce the power consumption of the cantilever type gas sensors.

The present invention solves the above technical problem by using the following technical solution.

A single cantilever gas sensor having a base structure and a cantilever structure, includes the following parts that are successively stacked:

a silicon substrate;

a supporting film, wherein the supporting film includes a first base part and a first cantilever, the first cantilever is connected to one side of the first base part;

a heating resistor, wherein the heating resistor includes a second base part and a second cantilever, wherein, the second cantilever is connected to one side of the second base part; a first window is provided on a side of the second base part opposite to the second cantilever, a second window extending along a longitudinal direction of the second cantilever is provided on the second cantilever, and the second window is connected to the first window; first lead wires are respectively provided on the second base part at positions on both sides of the first window;

an isolation film, wherein the isolation film includes a third base part and a third cantilever, wherein, the third cantilever is connected to one side of the third base part; a through hole is provided on the third base part at a position corresponding to the first lead wires, and the first lead wires pass through the corresponding through hole to be exposed outside; the thickness of the isolation film is greater than the thickness of the heating resistor;

a detecting electrode, wherein the detecting electrode includes a fourth base part and a fourth cantilever, the fourth cantilever is connected to one side of the fourth base part; a third window is provided at one side of the fourth base part opposite to the fourth cantilever; a fourth window extending along a longitudinal direction of the fourth cantilever and dividing the fourth cantilever is provided on the fourth cantilever, the fourth window is connected to the third window, and the detecting electrode is divided into two parts by the third window and the fourth window; the detecting electrode does not cover the through hole; second lead wires are provided on the detecting electrode at positions on both sides of the third window;

the silicon substrate, the first base part, the second base part, the third base part, and the fourth base part are correspondingly configured to form the base structure; the first cantilever, the second cantilever, the third cantilever, and the fourth cantilever are correspondingly configured to form the cantilever structure; and a gas sensitive material is provided on the end of the fourth cantilever away from the base structure.

Preferably, in the single cantilever gas sensor of the present invention, the first cantilever, the second cantilever, the third cantilever, and the fourth cantilever are all rectangular-shaped.

Preferably, in the single cantilever gas sensor of the present invention, the first cantilever, the second cantilever, the third cantilever, and the fourth cantilever are isosceles trapezoid shaped and have a width gradually decreasing along a direction away from the base structure.

Preferably, in the single cantilever gas sensor of the present invention, a first hole extending along a longitudinal direction of the first cantilever is provided on the first cantilever.

Preferably, in the single cantilever gas sensor of the present invention, a second hole is provided on the third cantilever, the second hole extends along a longitudinal direction of the third cantilever, and the second hole corresponds to the first hole.

Preferably, in the single cantilever gas sensor of the present invention, the silicon substrate, the first base part, the second base part, the third base part, and the fourth base part are all rectangular-shaped; a length of a side of the fourth base part provided with the fourth cantilever is shorter than a length of a side of the first window away from the second cantilever, or a length of a side of the third window away from the fourth cantilever is longer than a length of a side of the second base part provided with the second cantilever.

Preferably, in the single cantilever gas sensor of the present invention, the supporting film is a composite film formed by a single silicon oxide layer and a single silicon nitride layer; the silicon oxide layer and the silicon nitride layer are successively provided on the silicon substrate, and the thickness of the silicon nitride layer is greater than the thickness of the silicon oxide layer; the isolation film is a silicon oxide film or a silicon nitride film.

The present invention further provides a sensor array that is composed of a plurality of the above single cantilever gas sensors.

The present invention provides a sensor manufacturing method for manufacturing the above single cantilever gas sensor, and the method includes the following steps:

(1) selecting a silicon substrate according to the following conditions: when a membrane is released by an isotropic dry etching or wet etching, there is no requirement for the crystal orientation of the silicon substrate; when the membrane is released by an anisotropic wet etching, a silicon wafer with a <100> crystal orientation is selected;

(2) preparing a supporting film: preparing the supporting film on the silicon substrate by a thermal oxidation method and a low pressure chemical vapor deposition method;

(3) preparing a heating resistor: preparing the heating resistor by a lift-off process;

(4) preparing an isolation film: firstly preparing the isolation film by a plasma enhanced chemical vapor deposition, and then etching the isolation film by a reactive ion etching or an ion beam etching to form the through hole to expose the heating resistor;

(5) preparing a detecting electrode: preparing the detecting electrode by the lift-off process;

(6) membrane releasing: first, completely etching an exposed supporting film by the reactive ion etching or the ion beam etching to expose the silicon substrate and form a membrane releasing window; then hollowing out the silicon substrate under the supporting film to release the membrane by using an anisotropic wet etching solution of tetramethylammonium hydroxide or potassium hydroxide, or an isotropic wet etching solution consisting of hydrofluoric acid, nitric acid, and water, or isotropic dry etching gas of $XeF_2$; and (7) loading a gas sensitive material: after coating the end part of the cantilever structure with the gas sensitive material, a high temperature sintering is performed to complete the loading of the gas sensitive material.

Preferably, in the method for preparing the sensor of the present invention, the heating resistor in step (3) is a platinum resistor having the thickness of 1000 Å to 3000 Å; the thickness of the isolation film in step (4) is 1000 Å to 10000 Å; the detecting electrode in step (5) is a platinum electrode or a gold electrode with the thickness of 1000 Å to 3000 Å.

The advantages of the present invention are as follows.

The technical solution of the present invention uses a single cantilever type structure, where the effective region is provided at the end of the cantilever, and the power consumption of the sensor is reduced to 1 milliwatt by reducing the area of the effective region and reducing the number of cantilevers.

The single cantilever type sensor has a smaller size, higher integration degree, and the integration degree is an order of magnitude higher than that of the existing multi-cantilever type structure.

The preparation method of the single cantilever gas sensor provided by the present invention is simple in process, easy to locate, can effectively improve the production efficiency, and is easier to load a composite structure of gas sensitive material.

DETAILED DESCRIPTION OF THE EMBODIMENTS

In order to facilitate the understanding of the technical solution of the present invention by those skilled in the art, the technical solution of the present invention will be further described with reference to the drawings.

Figure 1:
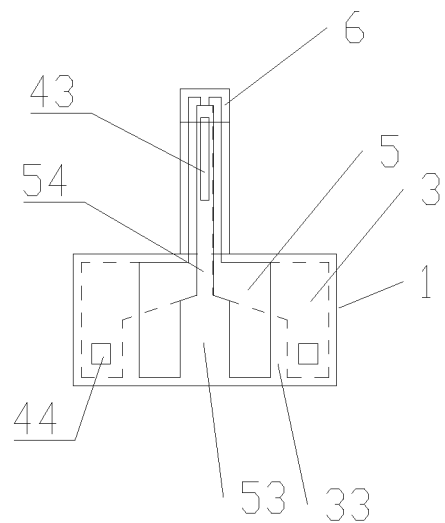
FIG. 1 is a structural schematic diagram of a single cantilever gas sensor according to an embodiment of the present invention.
Figure 2:
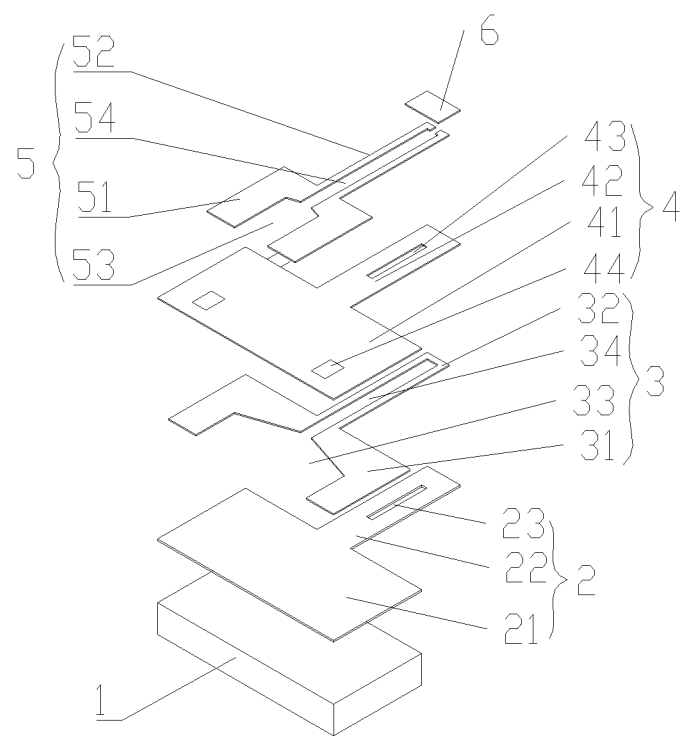
FIG. 2 is an exploded view of FIG. 1.

Referring to FIG. 1 and FIG. 2, the present invention provides a single cantilever gas sensor including the silicon substrate 1, the supporting film 2, the heating resistor 3, the isolation film 4, the detecting electrode 5, and the gas sensitive material 6.

The sensor includes a base structure and a cantilever structure. Generally, the base structure is rectangular-shaped, and the cantilever structure is provided in a middle part of a long side of the base structure to form a "T" type single cantilever structure. The silicon substrate 1, the supporting film 2, the heating resistor 3, the isolation film 4, and the detecting electrode 5 are stacked successively from bottom to top. The specific structure thereof is as follows.

The upper and lower end surfaces of the silicon substrate 1 are rectangular-shaped. The supporting film 2 is used to support the entire cantilever structure. The supporting film 2 includes the rectangular-shaped first base part 21. The first cantilever 22 extending outward is provided on a middle part of a long side of the first base part 21.

The heating resistor 3 is made of a metal or semiconductor material to provide the required operating temperature for the sensor operation. The heating resistor 3 includes the rectangular-shaped second base part 31. The second cantilever 32 is provided on a middle part of the long side of the second base part 31. The first window 33 is provided on a side of the second base part 31 opposite to the second cantilever 32. The second window 34 extending along a longitudinal direction of the second cantilever 32 is provided on the second cantilever 32, and the second window 34 is connected to the first window 33. The heating resistor 3 is provided with two first lead wires 56. The two first lead wires 56 are respectively provided on the sides of the second base part 31 away from the second cantilever 32 and are located on the two sides of the first window 33.

The isolation film 4 is made of an insulating medium such as silicon nitride, silicon oxide, etc. for electrically isolating the heating resistor 3 and the detecting electrode 5. The isolation film 4 includes the rectangular-shaped third base part 41. Through holes 44 are respectively provided on the third base part 41 at positions corresponding to the first lead wires 56. The first lead wires 56 pass through the corresponding through holes 44 to be exposed to the outside. The third cantilever 42 is provided in a middle part of a long side of the third base part 41. The thickness of the isolation film 4 is greater than the thickness of the heating resistor 3.

Generally, the detecting electrode 5 is an electrode made of a noble metal material such as platinum or gold. The detecting electrode 5 includes the rectangular-shaped fourth base part 51. The fourth cantilever 52 is provided on a middle part of a long side of the fourth base part 51. The third window 53 is provided on a side of the fourth base part 51 opposite to the fourth cantilever 52. The fourth window 54 extending along a longitudinal direction of the fourth cantilever 52 and dividing the fourth cantilever 52 is provided on the fourth cantilever 52. The fourth window 54 is connected to the third window 53. Two second lead wires 57 are provided on the detecting electrode 5. The two second lead wires 57 are respectively provided on the sides of the fourth base part 51 away from the third window 53 and are located on the two sides of the third window 53. It should be noted that the fourth base part 51 cannot block the through hole 44.

The silicon substrate 1, the first base part 21, the second base part 31, the third base part 41, and the fourth base part 51 are correspondingly provided to form a base structure. The first cantilever 22, the second cantilever 32, the third cantilever 42, and the fourth cantilever 52 are correspondingly provided to form a cantilever structure.

The gas sensitive material 6 is made of a metal oxide semiconductor material of nanometer or lower scale such as tin dioxide, zinc oxide, other oxides, etc. The gas sensitive material 6 is provided on the end of the fourth cantilever 52 away from the base structure, so that the gas sensitive material 6 is electrically connected to the detecting electrode 5. The resistivity of the gas sensitive material 6 changes in response to the absorption of a specific type of gas molecules, thereby achieving the purpose of detecting the gas.

The core part of the gas sensor is the cantilever structure. The effective region for loading the gas sensitive material is only located at the end of the cantilever structure away from the base structure. On the one hand, the heat loss caused by heat convection and heat radiation is reduced by reducing the area of the effective region. On the other hand, the cantilever structure has a slender structure, which can greatly reduce the heat loss during the heat conduction, so that the sensor has an extremely low power consumption.

It should be noted that, in the present embodiment, the case where the base structure has a rectangular shape and the cantilever structure is provided on the middle part of the long side of the rectangular base structure is taken as an example. These conditions are, however, not strict rules. In the practical production process, the specific shape of the base structure and the location of the cantilever structure may be set as needed.

As shown in FIG. 2, in one structure of the sensor, the first cantilever 22, the second cantilever 32, the third cantilever 42, and the fourth cantilever 52 are all rectangular-shaped.

Figure 3:
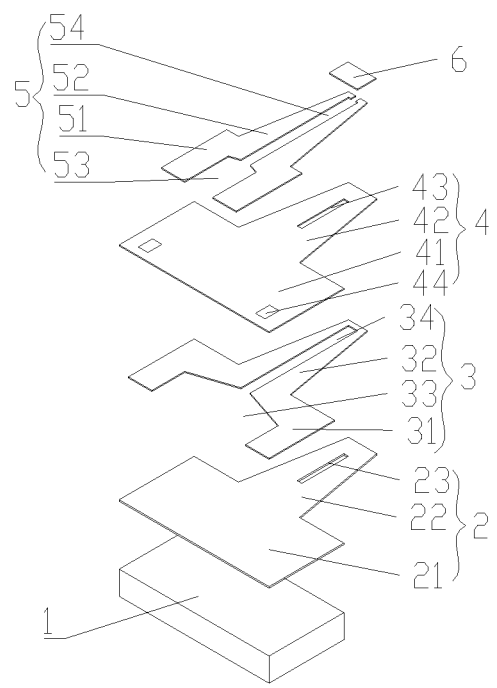
FIG. 3 is an exploded view of another single cantilever gas sensor according to an embodiment of the present invention.

As shown in FIG. 3, in another structure of the sensor, the first cantilever 22, the second cantilever 32, the third cantilever 42, and the fourth cantilever 52 are all isosceles trapezoidal shaped. The widths of the first cantilever 22, the second cantilever 32, the third cantilever 42, and the fourth cantilever 52 are gradually decreasing along a direction away from the base structure. Besides maintaining the feature of low power consumption of the single cantilever type structure, the mechanical strength of the entire sensor can be further improved by increasing the width of the connection joint of the cantilever structure and the base structure.

The first hole 23 reversely extending along the longitudinal direction of the first cantilever 22 is provided on the first cantilever 22. The second hole 43 extending along the longitudinal direction of the third cantilever 42 is provided on the third cantilever 42. The first hole 23 corresponds to the second hole 43. The heat loss during the heat conduction is further reduced by providing the elongated first hole 23 and second hole 43.

More specifically, the length of the long side of the fourth base part 51 is shorter than the length of the side of the first window 33 away from the second cantilever 32. Alternatively, other arrangements may also be adopted in other embodiments, for example, the length of the side of the third window 53 away from the third cantilever 52 is greater than the length of the long side of the second base part 31.

Figure 5:
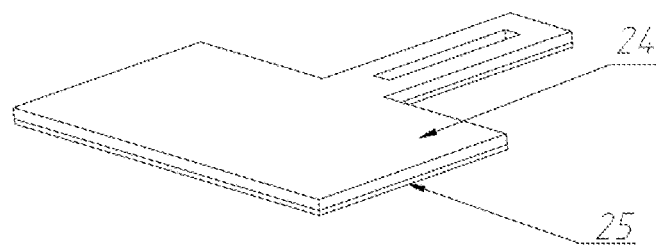
FIG. 5 is a structural schematic diagram of a supporting film according to an embodiment of the present invention.
Figure 6:
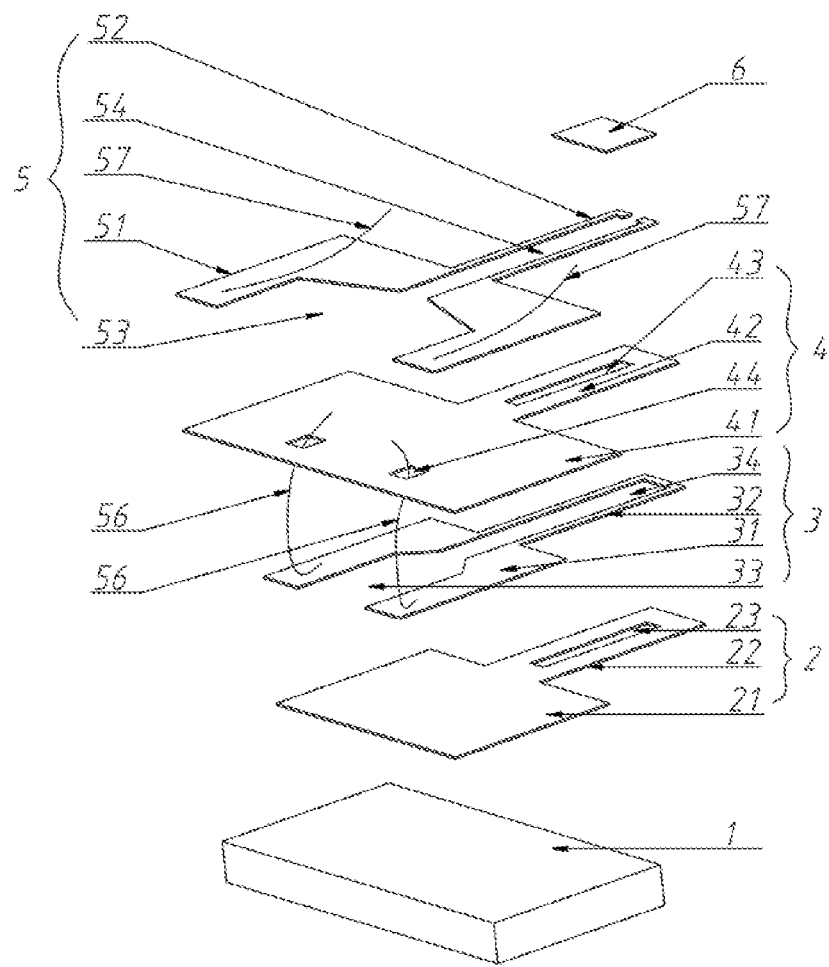
FIG. 6 is an exploded view of the single cantilever gas sensor having first lead wires and second lead wires, where a length of a side of a third window away from a fourth cantilever is longer than a length of a side of a second base part provided with a second cantilever.

The supporting film 2 is a composite film formed by a single silicon oxide layer 25 and a single silicon nitride layer 24, as shown in FIG. 5. The silicon oxide layer 25 and the silicon nitride layer 24 are successively provided on the silicon substrate 1, and the thickness of the silicon nitride layer 24 is greater than the thickness of the silicon oxide layer 25. The isolation film 4 is a silicon oxide film or a silicon nitride film.

In the present embodiment, the first window 33 may be configured to have a symmetrical structure. The heating resistor 3 is formed with a symmetrical structure by configuring the first window 33 and the second window 34. The third window 53 has a symmetrical structure. The detecting electrode 5 is divided into two symmetrical parts by the third window 53 and the fourth window 54. It should be noted that, in actual production, as needed, the first window 33 and the third window 53 may have an asymmetrical structure, and in this case, the heating resistor 3 and the detecting electrode 5 are configured to have asymmetric structures as well.

Figure 4:
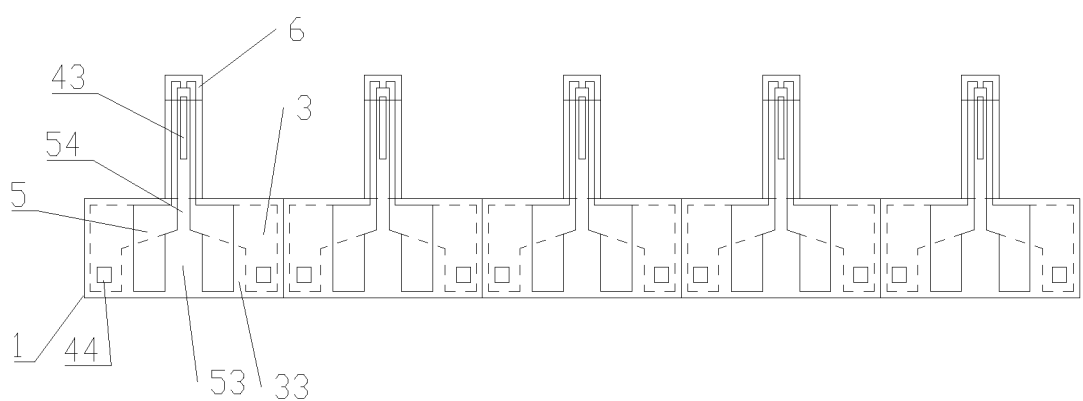
FIG. 4 is a structural schematic diagram of a sensor array according to an embodiment of the present invention.

In odor recognition applications, a large number of sensors are often integrated to work together. The single cantilever type sensor provided in the present embodiment is easy to realize the integration of multiple sensors to form a sensor array owing to its unique structure. As shown in FIG. 4, the present embodiment further provides a sensor array which is formed by tiling the above single cantilever sensors, wherein the cantilever structures of the sensors are located on the same side of the base structure. Of course, the cantilever structures of the sensors may also be distributed on two sides of the base structure or in other arrangements as needed.

Compared with the manufacturing method for the conventional multi-cantilever sensors, the manufacturing method of the single cantilever gas sensor described in the present embodiment has the characteristics of simple positioning and simple process. The details will be described below by way of specific embodiments.

Embodiment 1

A method for manufacturing a single cantilever gas sensor includes the following steps.

(1) A silicon wafer with <100> crystal orientation is selected as the substrate, the resistivity thereof is 3-8 Ω·cm, the thickness of the silicon wafer is 350±10 μm, and the angular error of the trimming is less than 1%.

(2) A layer of silicon oxide having the thickness of 3000 Å and a layer of silicon nitride having the thickness of 10000 Å are successively deposited on the substrate by a thermal oxidation method and a low pressure chemical vapor deposition method.

(3) Preparation of the heating resistor 3: a heating resistor wire of a platinum resistor with the thickness of 2000 Å is made by a lift-off process.

(4) Preparation of the isolation film 4: silicon oxide or silicon nitride is prepared as the isolation film 4 by a plasma enhanced chemical vapor deposition, the thickness of the isolation film 4 is 4000 Å. Then, the isolation film 4 is etched by a reactive ion etching or ion beam etching to form the through hole 44 to expose the underlying heating resistor 3.

(5) Preparation of the detection electrode 5: the detection electrode 5 made of platinum with the thickness of 2000 Å is prepared by the lift-off process.

(6) Membrane releasing: firstly, the exposed supporting film 2 is completely etched by reactive ion etching (ME) or ion beam etching, and the silicon substrate 1 is exposed to form a membrane releasing window, then tetramethylammonium hydroxide with a concentration of 25% is used for wet etching, and the etching duration is 8 hours.

(7) Gas sensitive material 6 loading: the end of the cantilever structure is coated with an appropriate amount of the colloidal gas sensitive material of tin dioxide, and then is sintered at 600° C. for 2 hours to complete the loading of the gas sensitive material 6, thereby obtaining the single cantilever type gas sensor. After that, the first lead wires 56 and the second lead wires 57 are provided at the corresponding positions.

Embodiment 2

A method for preparing a single cantilever gas sensor includes the following steps.

(1) A silicon wafer is selected as the substrate, the resistivity thereof is 3-8 Ω·cm, the thickness of the silicon wafer is 350±10 and the angular error of the trimming is less than 1%.

(2) a layer of silicon oxide having the thickness of 2000 Å and a layer of silicon nitride having the thickness of 6000 Å are successively deposited on the substrate by a thermal oxidation method and a low pressure chemical vapor deposition method.

(3) Preparation of the heating resistor 3: a heating resistor wire of a platinum resistor with the thickness of 1000 Å is prepared by a lift-off process.

(4) Preparation of the isolation film 4: silicon oxide or silicon nitride is made as the isolation film 4 by plasma enhanced chemical vapor deposition, the thickness of the isolation film 4 is 2000 Å. Then, the isolation film 4 is etched by reactive ion etching or ion beam etching to form the through hole 44 to expose the underlying heating resistor 3.

(5) Preparation of the detection electrode 5: the detection electrode 5 made of platinum with the thickness of 1000 Å is prepared by the lift-off process.

(6) Membrane releasing: firstly, the exposed supporting film 2 is completely etched by the RIE etching or Ion-beam etching, and the silicon substrate 1 is exposed to form a membrane releasing window, and the silicon substrate 1 is then etched by a dry etching gas of xenon difluoride ($XeF_2$), and the etching duration is 30 min.

(7) Gas sensitive material 6 loading: the end of the cantilever structure is coated with an appropriate amount of the colloidal gas sensitive material of trioxide, and then is sintered at 600° C. for 2 hours to complete the loading of the gas sensitive material 6, thereby obtaining the single cantilever type gas sensor. After that, the first lead wires 56 and the second lead wires 57 are provided at the corresponding positions.

Embodiment 3

A method for preparing a single cantilever gas sensor includes the following steps.

(1) A silicon wafer is selected as the substrate, the resistivity thereof is 3-8 Ω·cm, the thickness of the silicon wafer is 350±10 μm, and the angular error of the trimming is less than 1%.

(2) A layer of silicon oxide having the thickness of 3000 Å and a layer of silicon nitride having the thickness of 10000 Å are successively deposited on the substrate by a thermal oxidation method and a low pressure chemical vapor deposition method.

(3) Preparation of the heating resistor 3: a heating resistor wire of a platinum resistor with the thickness of 1000 Å is made by a lift-off process.

(4) Preparation of the isolation film 4: silicon oxide or silicon nitride is made as the isolation film 4 by plasma enhanced chemical vapor deposition, and the thickness of the isolation film 4 is 4000 Å. Then, the isolation film 4 is etched by reactive ion etching or ion beam etching to expose the underlying heating resistor 3.

(5) Preparation of the detection electrode 5: the detection electrode 5 made of platinum with the thickness of 2000 Å is prepared by the lift-off process.

(6) Membrane releasing: firstly, the exposed supporting film 2 is completely etched by the ME etching or Ion-beam etching, and the silicon substrate 1 is exposed to form a membrane releasing window, and the silicon substrate 1 is then etched by an isotropic wet etching solution with an etching duration of 4 hours.

(7) Gas sensitive material 6 loading: the end of the cantilever structure is coated with an appropriate amount of the colloidal gas sensitive material of tin dioxide, and then is sintered at 550° C. for 3 hours to complete the loading of the gas sensitive material 6, thereby obtaining the single cantilever type gas sensor. After that, the first lead wires 56 and the second lead wires 57 are provided at the corresponding positions.

The method for manufacturing the single cantilever gas sensor array with the single cantilever gas sensors is basically the same as the method for manufacturing the single cantilever gas sensor described above. The only difference is that the etching conditions should be set in step (6) to form a sensor array after the membrane is released, in which a plurality of base structures are successively connected, and each of the base structures is configured with a cantilever structure. Then, the gas sensitive material of tin dioxide is respectively coated at the end of each cantilever structure with different amounts to form the single cantilever gas sensor array.

The technical solution of the present invention has been exemplarily described above with reference to the drawings. It is obvious that the specific implementation of the present invention is not limited to the above methods. All immaterial improvements that are based on the method, conception, and technical solution of the present invention, or the direct application of the conception and technical solution of the present invention in other occasions without any modification, should be considered as falling within the scope of the present invention.

What is claimed is:

1. A single cantilever gas sensor having a base structure and a cantilever structure comprising the following parts that are successively stacked: a silicon substrate; a supporting film, wherein the supporting film comprises a first base part and a first cantilever, the first cantilever is connected to one side of the first base part; a heating resistor, wherein the heating resistor comprises a second base part and a second cantilever, the second cantilever is connected to one side of the second base part; a first window is provided on a side of the second base part opposite to the second cantilever, a second window extending along a longitudinal direction of the second cantilever is provided on the second cantilever, the second window is connected to the first window, and first lead wires are respectively provided on the second base part at positions on both sides of the first window; an isolation film, wherein the isolation film comprises a third base part and a third cantilever, the third cantilever is connected to one side of the third base part, a through hole is provided on the third base part at a position corresponding to the first lead wires, the first lead wires pass through the corresponding through hole to be exposed outside, and a thickness of the isolation film is greater than a thickness of the heating resistor; a detecting electrode, wherein the detecting electrode comprises a fourth base part and a fourth cantilever, the fourth cantilever is connected to one side of the fourth base part, a third window is provided on a side of the fourth base part away from the fourth cantilever, a fourth window extending along a longitudinal direction of the fourth cantilever and dividing the fourth cantilever is provided on the fourth cantilever, the fourth window is connected to the third window, and the detecting electrode is divided into two parts by the third window and the fourth window; the detecting electrode does not cover the through hole of the isolation film, and second lead wires are provided on the detecting electrode at positions on both sides of the third window; the silicon substrate, the first base part, the second base part, the third base part, and the fourth base part are configured to form the base structure; the first cantilever, the second cantilever, the third cantilever, and the fourth cantilever are configured to form the cantilever structure; and a gas sensitive material is provided on the end of the fourth cantilever away from the base structure.

2. The single cantilever gas sensor of claim 1, wherein the first cantilever, the second cantilever, the third cantilever, and the fourth cantilever are all rectangular-shaped.

3. The single cantilever gas sensor of claim 2, wherein a first hole extending along a longitudinal direction of the first cantilever is provided on the first cantilever.

4. The single cantilever gas sensor of claim 1, wherein the first cantilever, the second cantilever, the third cantilever, and the fourth cantilever are all isosceles trapezoid shaped and have a width decreasing along a direction away from the base structure.

5. The single cantilever gas sensor of claim 4, wherein a first hole extending along a longitudinal direction of the first cantilever is provided on the first cantilever.

6. The single cantilever gas sensor of claim 1, wherein a first hole extending along a longitudinal direction of the first cantilever is provided on the first cantilever.

7. The single cantilever gas sensor of claim 6, wherein a second hole is provided on the third cantilever, the second hole extends along a longitudinal direction of the third cantilever, and the second hole corresponds to the first hole.

8. The single cantilever gas sensor of claim 6, wherein the silicon substrate, the first base part, the second base part, the third base part, and the fourth base part are all rectangular-shaped;
a length of a side of the fourth base part provided with the fourth cantilever is shorter than a length of a side of the first window away from the second cantilever; or
a length of a side of the third window away from the fourth cantilever is longer than a length of a side of the second base part provided with the second cantilever.

9. The single cantilever gas sensor of claim 1, wherein the supporting film is a composite film formed by a single silicon oxide layer and a single silicon nitride layer;
the silicon oxide layer and the silicon nitride layer are successively provided on the silicon substrate, and a thickness of the silicon nitride layer is greater than a thickness of the silicon oxide layer; and
the isolation film is a silicon oxide film or a silicon nitride film.

10. A sensor array, wherein the sensor array is composed of a plurality of the single cantilever gas sensors of claim 1.

11. The sensor array of claim 10, wherein the first cantilever, the second cantilever, the third cantilever, and the fourth cantilever are all rectangular-shaped.

12. The sensor array of claim 10, wherein the first cantilever, the second cantilever, the third cantilever, and the fourth cantilever are all isosceles trapezoid shaped and have a width decreasing along a direction away from the base structure.

13. The sensor array of claim 10, wherein a first hole extending along a longitudinal direction of the first cantilever is provided on the first cantilever.

14. The sensor array of claim 13, wherein a second hole is provided on the third cantilever, the second hole extends along a longitudinal direction of the third cantilever, and the second hole corresponds to the first hole.

15. The sensor array of claim 13, wherein the silicon substrate, the first base part, the second base part, the third base part, and the fourth base part are all rectangular-shaped;
a length of a side of the fourth base part provided with the fourth cantilever is shorter than a length of a side of the first window away from the second cantilever; or
a length of a side of the third window away from the fourth cantilever is longer than a length of a side of the second base part provided with the second cantilever.

16. The sensor array of claim 10, wherein the supporting film is a composite film formed by a single silicon oxide layer and a single silicon nitride layer;
the silicon oxide layer and the silicon nitride layer are successively provided on the silicon substrate, and a thickness of the silicon nitride layer is greater than a thickness of the silicon oxide layer; and
the isolation film is a silicon oxide film or a silicon nitride film.

17. A method for manufacturing the single cantilever gas sensor of claim 1, comprising the following steps:

(1) selecting a silicon substrate according to the following conditions: when a membrane is released by an isotropic dry etching or wet etching, there is no requirement for a crystal orientation of the silicon substrate; when the membrane is released by an anisotropic wet etching, a silicon wafer with a <100> crystal orientation is selected;

(2) preparing a supporting film: preparing the supporting film on the silicon substrate by a thermal oxidation method and a low pressure chemical vapor deposition method;

(3) preparing a heating resistor: preparing the heating resistor by a lift-off process;

(4) preparing an isolation film: firstly preparing the isolation film by a plasma enhanced chemical vapor deposition, and then etching the isolation film by a reactive ion etching or an ion beam etching to form the through hole to expose the heating resistor;

(5) preparing a detecting electrode: preparing the detecting electrode by the lift-off process;

(6) releasing membrane: first, completely etching an expose supporting film by the reactive ion etching or the ion beam etching to expose the silicon substrate and form a membrane releasing window; then hollowing out the silicon substrate under the supporting film to release the membrane by using an anisotropic wet etching solution of tetramethylammonium hydroxide or potassium hydroxide, or an isotropic wet etching solution, or isotropic dry etching gas of $XeF_2$; and (7) loading a gas sensitive material: after coating the end part of the cantilever structure with the gas sensitive material, a sintering is performed to complete the loading of the gas sensitive material.

18. The method of claim 17, wherein the heating resistor in step (3) is a platinum resistor having a thickness of 1000 Å to 3000 Å; the thickness of the isolation film in step (4) is 1000 Å to 10000 Å; and the detecting electrode in step (5) is a platinum electrode or a gold electrode with a thickness of 1000 Å to 3000 Å.

19. The method of claim 17, wherein a first hole extending along a longitudinal direction of the first cantilever is provided on the first cantilever.

20. The method of claim 19, wherein a second hole is provided on the third cantilever, the second hole extends along a longitudinal direction of the third cantilever, and the second hole corresponds to the first hole.

* * * * *